United States Patent
Wang et al.

(10) Patent No.: US 11,271,506 B2
(45) Date of Patent: Mar. 8, 2022

(54) CONTROL DEVICE AND CONTROL METHOD FOR INDUCTION MOTOR

(71) Applicant: OMRON Corporation, Kyoto (JP)

(72) Inventors: Yutao Wang, Shanghai (CN); Shaofeng Liu, Shanghai (CN)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/266,621

(22) PCT Filed: Sep. 10, 2019

(86) PCT No.: PCT/CN2019/105160
§ 371 (c)(1),
(2) Date: Feb. 8, 2021

(87) PCT Pub. No.: WO2020/063331
PCT Pub. Date: Apr. 2, 2020

(65) Prior Publication Data
US 2021/0297027 A1 Sep. 23, 2021

(30) Foreign Application Priority Data
Sep. 25, 2018 (CN) .......................... 201811114754.4

(51) Int. Cl.
*H02P 21/30* (2016.01)
*H02P 21/18* (2016.01)
(Continued)

(52) U.S. Cl.
CPC ............ *H02P 21/30* (2016.02); *H02P 21/141* (2013.01); *H02P 21/18* (2016.02); *H02P 21/22* (2016.02); *H02P 2207/01* (2013.01)

(58) Field of Classification Search
CPC .......... H02P 21/30; H02P 21/18; H02P 21/22; H02P 21/141; H02P 2207/01
See application file for complete search history.

(56) References Cited

U.S. PATENT DOCUMENTS 9,520,821 B1 * 12/2016 Sheahan .................. H02P 21/20
2019/0140563 A1 * 5/2019 Kalygin .................... H02P 1/26

FOREIGN PATENT DOCUMENTS

| CN | 1825750 | 8/2006 |
| CN | 103427745 | 12/2013 |

(Continued)

OTHER PUBLICATIONS

"International Search Report (Form PCT/ISA/210) of PCT/CN2019/105160," dated Dec. 9, 2019, with English translation thereof, pp. 1-4.

(Continued)

*Primary Examiner* — Zoheb S Imtiaz
(74) *Attorney, Agent, or Firm* — JCIPRNET (57) ABSTRACT

A control device and a control method for an induction motor. The control device comprises: a magnetizing current adjusting unit used for calculating a magnetizing voltage instruction; a torque current adjusting unit used for calculating a torque voltage instruction; a flux linkage instruction angle generating unit calculating a flux linkage instruction angle according to a lower limit $\omega_{1th}$ of a preset stator frequency, a stator frequency $\omega_1$, and a flux linkage estimation angle; and a motor stator voltage instruction calculating unit calculating, according to the magnetizing voltage instruction, the torque voltage instruction, and the flux linkage instruction angle, a stator voltage instruction for controlling a stator of the motor. The control system can be run outside an unstable area, and the stability of control by the control device is improved.

10 Claims, 9 Drawing Sheets

(51) Int. Cl.
*H02P 21/22* (2016.01)
*H02P 21/14* (2016.01)

(56) References Cited

FOREIGN PATENT DOCUMENTS

| | | |
|---|---|---|
| CN | 103931098 | 7/2014 |
| JP | 2010022096 | 1/2010 |
| JP | 2010172125 | 8/2010 |

OTHER PUBLICATIONS

"Written Opinion of the International Searching Authority (Form PCT/ISA/237) of PCT/CN2019/105160," dated Dec. 9, 2019, with English translation thereof, pp. 1-4.

* cited by examiner

CONTROL DEVICE AND CONTROL METHOD FOR INDUCTION MOTOR

CROSS-REFERENCE TO RELATED APPLICATION

This application is a 371 application of the International PCT application serial no. PCT/CN2019/105160, filed on Sep. 10, 2019, which claims the priority benefits of China Patent Application No. 201811114754.4, filed on Sep. 25, 2018. The entirety of each of the above-mentioned patent applications is hereby incorporated by reference herein and made a part of this specification.

BACKGROUND

Technical Field

The present application relates to a field of motor technology, and in particular, to a control device and a control method for an induction motor.

Description of Related Art

When vector control is performed on a motor, it is sometimes difficult to install a sensor for detecting the rotor speed in the motor, or a sensor is not installed to reduce costs, and vector control is performed on the motor without a speed sensor.

Figure 1:
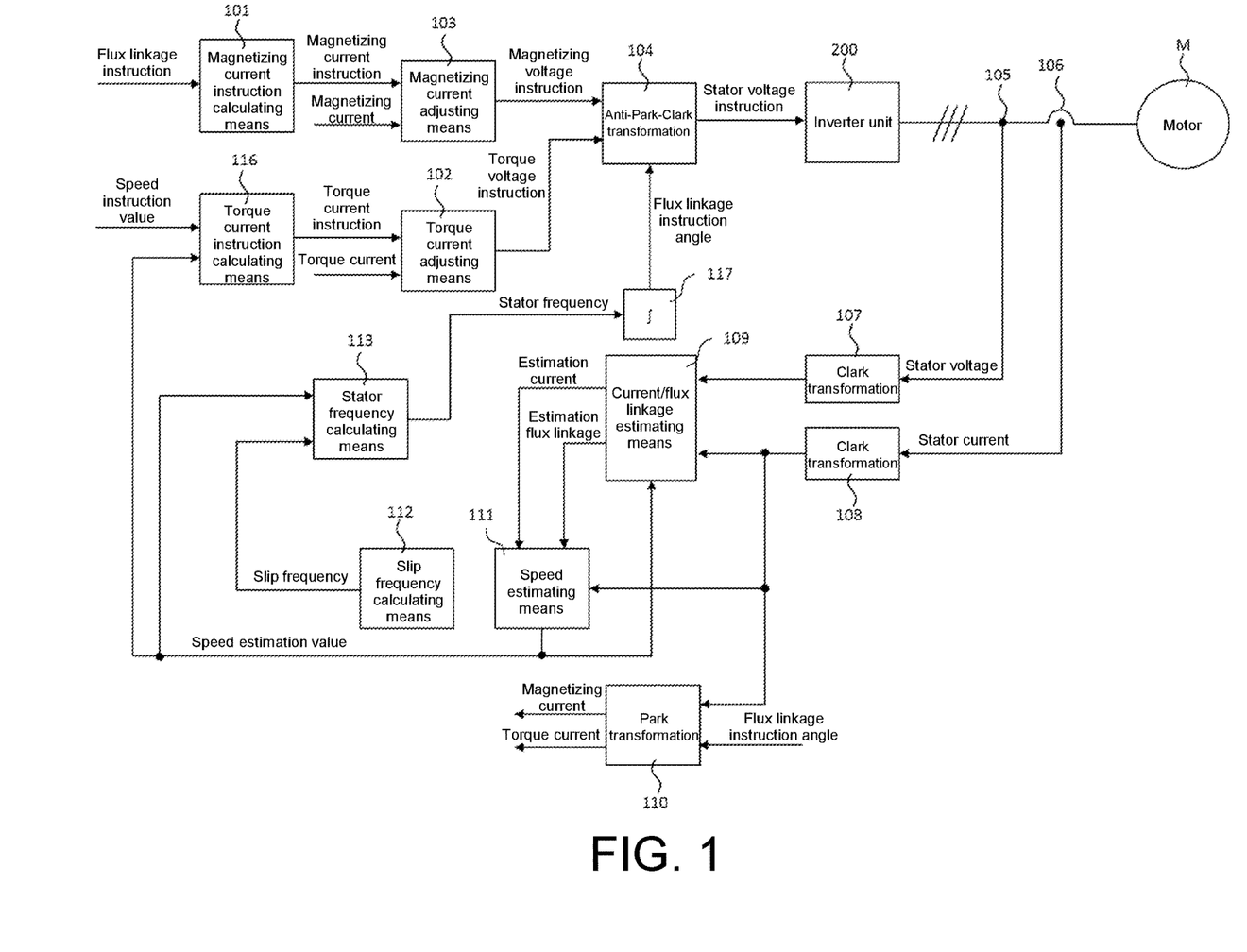
FIG. 1 is a system block diagram of vector control performed on a motor without a speed sensor in the related art.

FIG. 1 is a system block diagram of vector control performed on a motor without a speed sensor in the related art. As shown in FIG. 1,
a magnetizing current instruction calculating means 101 generates a magnetizing current instruction according to an inputted flux linkage instruction;
a magnetizing current adjusting means 103 obtains a magnetizing voltage instruction according to the magnetizing current instruction and a magnetizing current fed back by a park transformation means 110;
a torque current instruction calculating means 116 generates a torque current instruction according to an inputted speed instruction value and a speed estimation value fed back by a speed estimating means 111;
a torque current adjusting means 102 obtains a torque voltage instruction according to the torque current instruction and a torque current fed back by the park transformation means 110;
an anti-Park-Clark transformation means 104 performs an anti-Park-Clark transformation on the magnetizing voltage instruction and the torque voltage instruction based on a flux linkage instruction angle and obtains a stator voltage instruction of three phases U, V, and W; and an inverter unit 200 generates three-phase stator voltages U, V, and W used for being inputted to a stator of a motor M according to the stator voltage instruction, so as to control the motor M.

As shown in FIG. 1, the speed estimation value is generated through the following manners. The actually outputted three-phase stator voltages U, V, and W and a current flowing through the stator of the motor M are sampled, and a stator voltage and a current signal of a $\alpha$-$\beta$ coordinate system are obtained through Clark transformation means 107 and 108. A current/flux linkage estimating means 109, based on the speed estimation value fed back by the speed estimating means 111 and the stator voltage and the current signal of the $\alpha$-$\beta$ coordinate system outputted by the Clark transformation means 107 and 108, generates an estimation current and an estimation flux linkage. The speed estimating means 111, according to the estimation current, the estimation flux linkage, and the current signal outputted by the Clark transformation means 108, calculates a new speed estimation value.

As shown in FIG. 1, the magnetizing current and the torque current are generated through the following manner. The Park transformation means 110 performs a Park transformation on the current signal outputted by the Clark transformation means 108 based on the flux linkage instruction angle and obtains the magnetizing current and the torque current.

As shown in FIG. 1, the flux linkage instruction angle is generated through the following manners. A slip frequency calculating means 112 generates a slip frequency. A stator frequency calculating means 113, according to the speed estimation value fed back by the speed estimating means 111 and the slip frequency, calculates a stator frequency $\omega_1$. An integrator 117 integrates the stator frequency $\omega_1$ and obtains the flux linkage instruction angle.

According to FIG. 1, through inputting the flux linkage instruction and the speed instruction value to the control system, the stator voltage inputted to the motor M may be controlled, so as to perform vector control on the motor M.

In the control system shown in FIG. 1, the speed estimation value as the stator frequency $\omega_1$ calculated by the speed estimating means 111 may be located in an unstable area, that is, $\omega_1 \in (-\omega_{1th}, \omega_{1th})$. When the speed estimation value $\omega_1$ is located in the unstable area, it may cause the control system to lose control.

Patent Literature 1 discloses a control system for a motor capable of allowing the speed estimation value $\omega_1$ calculated by the speed estimating means to be located outside the unstable area and thus accordingly preventing the control system from losing control.

Figure 2:
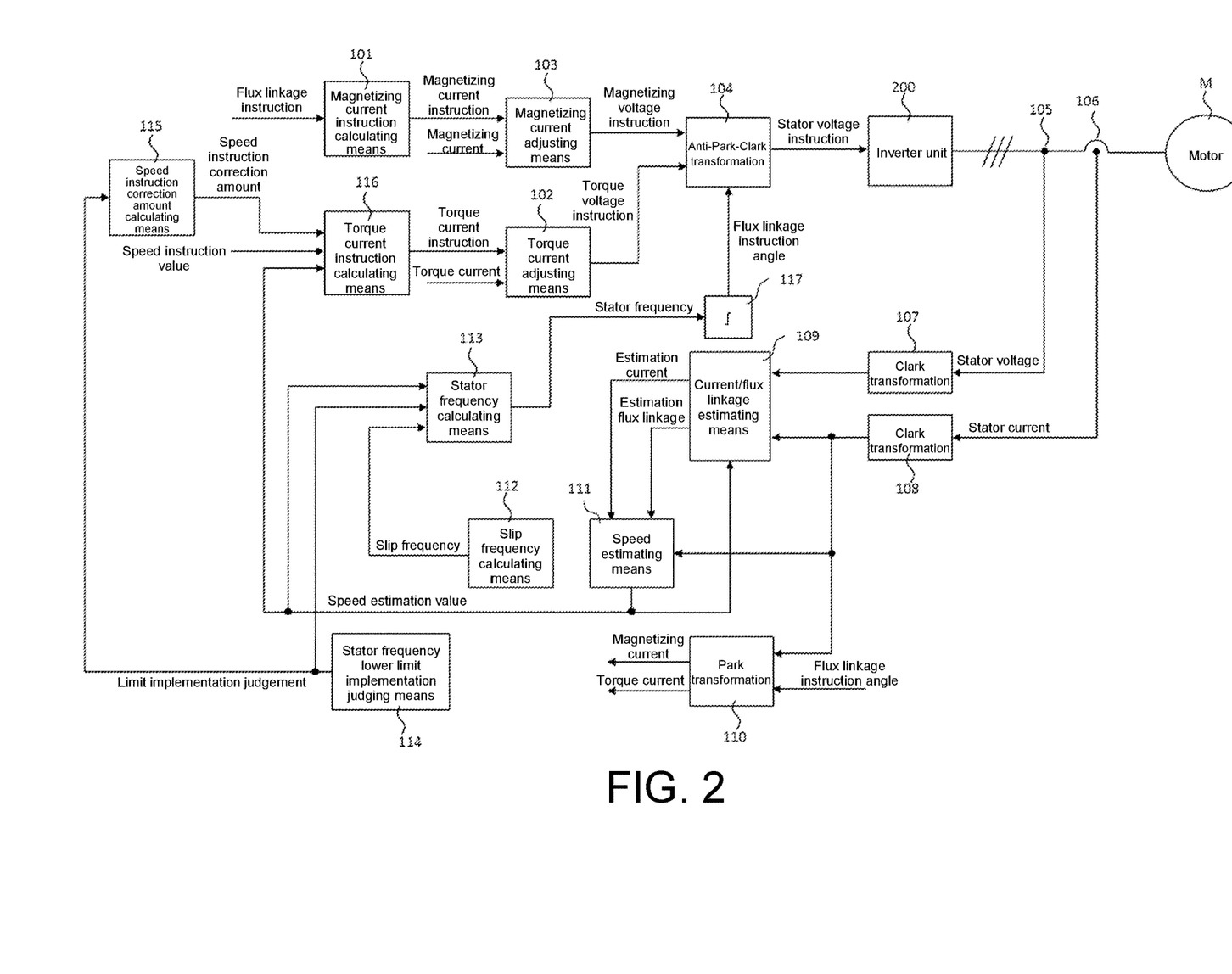
FIG. 2 is a schematic diagram of a control system of a motor recorded in Patent Literature 1.

FIG. 2 is a schematic diagram of a control system of a motor recorded in Patent Literature 1. When the control system shown in FIG. 2 and the control system shown in FIG. 1 are compared, a difference therebetween is that: a stator frequency lower limit implementation judging means 114 and a speed instruction correction amount calculating means 115 are added to the control system of FIG. 2.

In FIG. 2, the stator frequency lower limit implementation judging means 114 may, based on the speed instruction value inputted to the control system, the slip frequency calculated by the slip frequency calculating means 112, and a stator frequency lower limit $\omega_{1th}$, perform judgment and output a judging result. In FIG. 2, the stator frequency calculating means 113 performs processing according to the judging result of the stator frequency lower limit implementation judging means 114, so that the speed estimation value outputted by the stator frequency calculating means 113 is located outside the unstable area.

In FIG. 2, the speed instruction correction amount calculating means 115, according to the stator frequency lower limit $\omega_{1th}$, the speed instruction value, and the slip frequency, calculates a speed instruction correction amount and outputs different speed instruction correction amounts according to the judging result of the stator frequency lower limit implementation judging means 114. As such, the torque current instruction calculating means in FIG. 2, based on the speed instruction value, the speed estimation value, and the speed instruction correction amount, calculates the torque current instruction.

Patent Literature 1: Japanese Patent Publication No. 2010-22096A

It should be noted that the above introduction to the technical background is only set forth to facilitate a clear and complete description of the technical solutions of the disclosure and to facilitate understanding of a person having ordinary skill in the art. It should not be considered that the above technical solutions are well-known to a person having ordinary skill in the art just because these solutions are described in the BACKGROUND section of the disclosure.

SUMMARY

The present application found out that in Patent Literature 1, the stator frequency calculating means 113, the stator frequency lower limit implementation judging means 114, and the speed instruction correction amount calculating means 115 are all required to be calculated according to the slip frequency. A slip frequency $\omega_s$ is generally calculated and obtained by adopting the following formula (1):

$$\omega_s = \frac{R_r L_m}{L_r \psi_r} i_q \quad (1)$$

where $i_q$ is a torque current, $\psi_r$ is a rotor flux linkage, $L_m$ is mutual inductance between a rotor and a stator, and $R_r$ is resistance of the rotor.

From the above formula (1), it may be known that calculation accuracy of the slip frequency $\omega_s$ is significantly affected by the rotor resistance $R_r$. When the motor runs and generates heat, an error of the actual $R_r$ compared to a nominal value may even increase to more than 20%. A calculation deviation of $\omega_s$ may increase significantly, and therefore, operation results of the stator frequency calculating means 113, the stator frequency lower limit implementation judging means 114, and the speed instruction correction amount calculating means 115 all have deviations. Therefore, the control system may still run in the unstable area, so as to cause the control system to lose control.

The present application provides a control device and a control method for an induction motor capable of avoiding the use of the slip frequency $\omega_s$, which generates an error when being subjected to a resistance change, for calculation when the control device is used for performing vector control on the motor without a speed sensor, and accordingly, a control system can run outside an unstable area, and stability of control by the control device is improved.

According to an aspect of the embodiments of the present application, a control device for an induction motor is provided, and the control device includes:
a magnetizing current adjusting unit, used for calculating a magnetizing voltage instruction;
a torque current adjusting unit, used for calculating a torque voltage instruction;
a flux linkage instruction angle generating unit, calculating a flux linkage instruction angle according to a lower limit $\omega_{1th}$ of a preset stator frequency, a stator frequency $\omega_1$, and a flux linkage estimation angle $\angle \hat{\psi}_r$; and
a motor stator voltage instruction calculating unit, calculating, according to the magnetizing voltage instruction, the torque voltage instruction, and the flux linkage instruction angle, a stator voltage instruction for controlling a stator of the motor.

According to another aspect of the embodiments of the present application, where the flux linkage instruction angle generating unit includes:
a frequency difference calculating unit, calculating a difference value between the lower limit $\omega_{1th}$ of the preset stator frequency and the stator frequency $\omega_1$;
an integral unit, integrating the difference value to obtain a flux linkage instruction angle correction amount; and
a correction unit, correcting the flux linkage estimation angle $\angle \hat{\psi}_r$ by using the flux linkage instruction angle correction amount to obtain the flux linkage instruction angle.

According to another aspect of the embodiments of the present application, where a minimum value of the flux linkage instruction angle correction amount is 0, that is, a lower limit of the integral is 0.

According to another aspect of the embodiments of the present application, where the control device further includes:
a flux linkage estimation angle calculating unit, performing arctan calculation on flux linkages $\hat{\psi}_{ra}$ and $\hat{\psi}_{rb}$ based on an α-β coordinate system calculated based on a stator voltage signal, a stator current signal, and a speed estimation value of the motor to obtain the flux linkage estimation angle $\angle \hat{\psi}_r$.

According to another aspect of the embodiments of the present application, where the control device further includes:
a stator frequency calculating unit, deriving the flux linkage estimation angle $\angle \hat{\psi}_r$ with respect to time to obtain the stator frequency $\omega_1$.

According to another aspect of the embodiments of the present application, where the control device further includes:
a stator frequency calculating unit, performing arctan calculation on currents $I_a$ and $I_b$ based on an α-β coordinate system obtained based on a stator current flowing into the motor to obtain a current vector angle $\angle I$ and performing a differential operation on the current vector angle $\angle I$ next to obtain the stator frequency $\omega_1$.

According to another aspect of the embodiments of the present application, where the control device further includes:
a speed instruction correction amount calculating unit, used for calculating a speed instruction correction amount according to the lower limit $\omega_{1th}$ of the preset stator frequency and the stator frequency $\omega_1$,
where the speed instruction correction amount is used for adjusting a speed instruction value, so as to calculate the torque voltage instruction.

According to another aspect of the embodiments of the present application, where the speed instruction correction amount calculating unit includes:
a first calculating unit, used for calculating a difference value between the lower limit $\omega_{1th}$ of the preset stator frequency and the stator frequency $\omega_1$; and
a first determining unit, determining the speed instruction correction amount according to the difference value calculated by the first calculating unit. The following is further included:
a first proportional integral (PI) adjusting unit, performing a PI operation according to the difference value calculated by the first calculating unit and outputting a PI operation result,
where the first determining unit determines that the speed instruction correction amount is 0 when the PI operation result is less than 0,
where the first determining unit determines that the speed instruction correction amount is the PI operation result when the PI operation result is greater than or equal to 0.

According to another aspect of the embodiments of the present application, a control method for an induction motor is provided, and the control method includes:
calculating a magnetizing voltage instruction; and
calculating a torque voltage instruction.

A flux linkage instruction angle is calculated according to a lower limit of a preset stator frequency, a stator frequency, and a flux linkage estimation angle; and according to the magnetizing voltage instruction, the torque voltage instruction, and the flux linkage instruction angle, a stator voltage instruction for controlling stator operation of the motor is calculated.

The effect of the present application is: capable of avoiding the use of the slip frequency $\omega_s$, which generates an error when being subjected to a resistance change, for calculation, and accordingly, a control system can run outside an unstable area, and stability of control by the control device is improved.

With reference to the following description and accompanying drawings, specific embodiments of the present application are disclosed in detail, indicating the ways in which the principles of the present application can be adopted. It should be understood that the scope of the embodiments of the present application is not limited thereby. Within the spirit and scope of the terms of the appended claims, the embodiments of the present application include many changes, modifications, and equivalents.

BRIEF DESCRIPTION OF THE DRAWINGS

The included drawings are used to provide a further understanding of the embodiments of the present application, which constitute a part of the specification, are used to illustrate the embodiments of the present application, and together with the text description, explain the principle of the present application. Obviously, the drawings in the following description are only some embodiments of the present application, and for a person having ordinary skill in the art, other drawings can be obtained based on these drawings without creative labor. In the drawings:

FIG. 5 is a schematic diagram of a stator frequency calculating unit 202a;

DESCRIPTION OF THE EMBODIMENTS

With reference to the drawings, the foregoing and other features of the present application becomes apparent through the following description. In the specification and drawings, specific embodiments of the present application are specifically disclosed, representing some embodiments in which the principles of the present application can be adopted. It should be understood that the present application is not limited to the described embodiments. On the contrary, the present application includes all modifications, variations, and equivalents falling into the scope of the appended claims.

Embodiment 1

Figure 3:
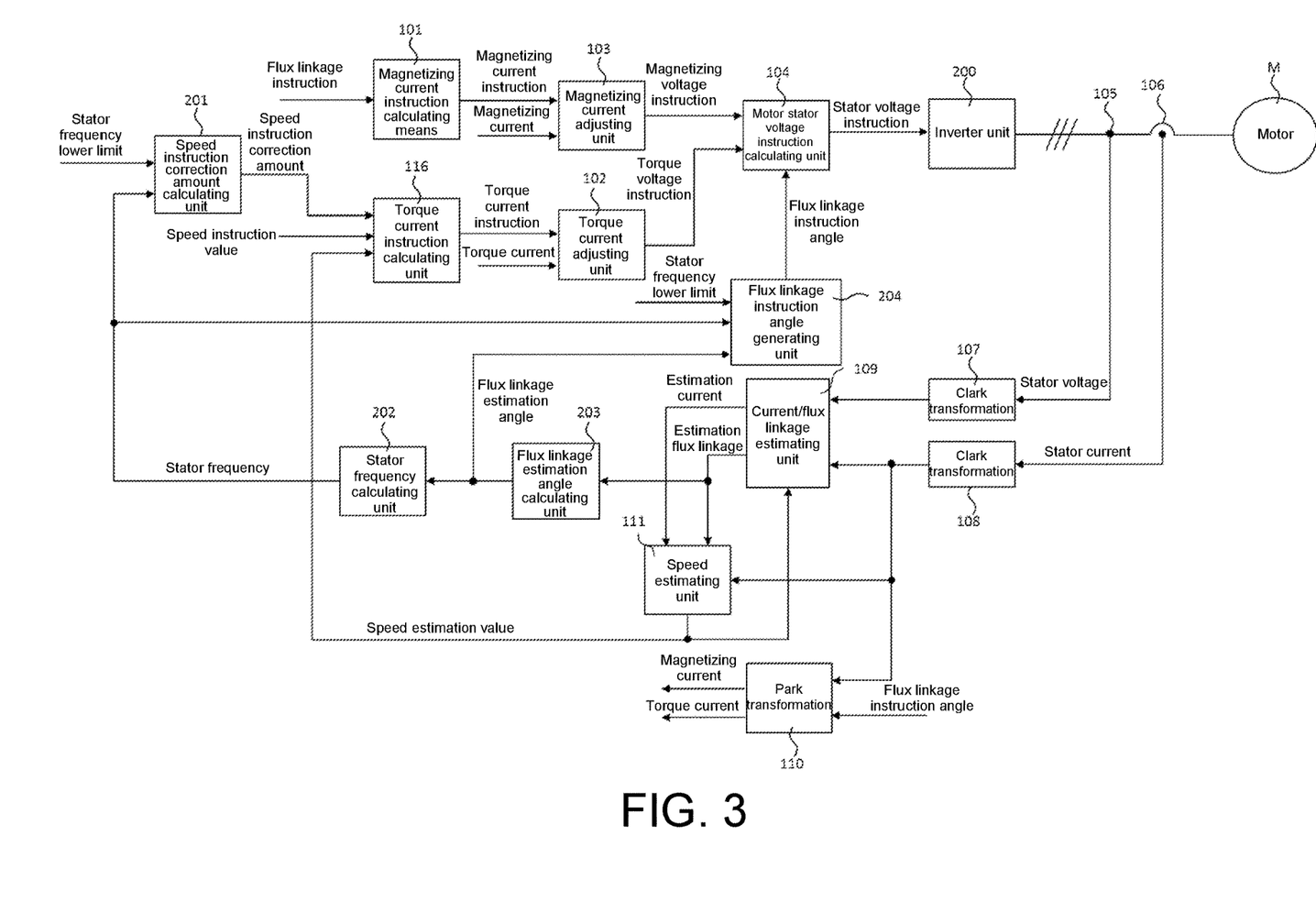
FIG. 3 is a schematic diagram of a control device of Embodiment 1 of the present application.

An embodiment of the present application provides a control device for an induction motor. FIG. 3 is a schematic diagram of a control device of the present embodiment.

As shown in FIG. 3, a control device 30 for an induction motor controls a stator voltage inputted to a motor M according to a flux linkage instruction, a speed instruction value, and a stator frequency lower limit inputted to the control device 30, so as to perform vector control on the motor M.

As shown in FIG. 3, the control device 30 for the induction motor includes: a magnetizing current adjusting unit 103, a torque current adjusting unit 102, a flux linkage instruction angle generating unit 204, and a motor stator voltage instruction calculating unit 104.

As shown in FIG. 3, the magnetizing current adjusting unit 103 may calculate a magnetizing voltage instruction according to a magnetizing current instruction and a magnetizing current.

The torque current adjusting unit 102 may calculate a torque voltage instruction according to a torque current and a torque current instruction. The flux linkage instruction angle generating unit 204 may calculate a flux linkage instruction angle according to a lower limit $\omega_{1th}$ of a preset stator frequency, a stator frequency $\omega_1$, and a flux linkage estimation angle $\angle \hat{\psi}_r$.

The motor stator voltage instruction calculating unit 104 may calculate, according to the magnetizing voltage instruction, the torque voltage instruction, and the flux linkage instruction angle, a stator voltage instruction for controlling a stator of the motor. In an embodiment, the motor stator voltage instruction calculating unit 104 may perform an anti-Park-Clark transformation on the magnetizing voltage instruction and the torque voltage instruction based on the flux linkage instruction angle, so as to obtain the stator voltage instruction.

In this embodiment, the stator voltage instruction obtained by the motor stator voltage instruction calculating unit 104 may be inputted to an inverter unit 200, so as to form three-phase stator voltages U, V, and W outputted to the motor.

In this embodiment, description of the magnetizing current adjusting unit 103, the torque current adjusting unit 102, the motor stator voltage instruction calculating unit 104, and the inverter unit 200 may be found with reference to Patent Literature 1 mentioned in the BACKGROUND section.

According to the present embodiment, in the control device 30 for the induction motor, when calculating the flux linkage instruction angle, the flux linkage instruction angle generating unit 204 may perform calculation not based on a slip frequency $\omega_s$ of the motor. Therefore, a resistance change of a motor rotor is prevented from affecting a calculation result. Accordingly, the control device can be run outside an unstable area, and stability of control by the control device is improved.

Figure 4:
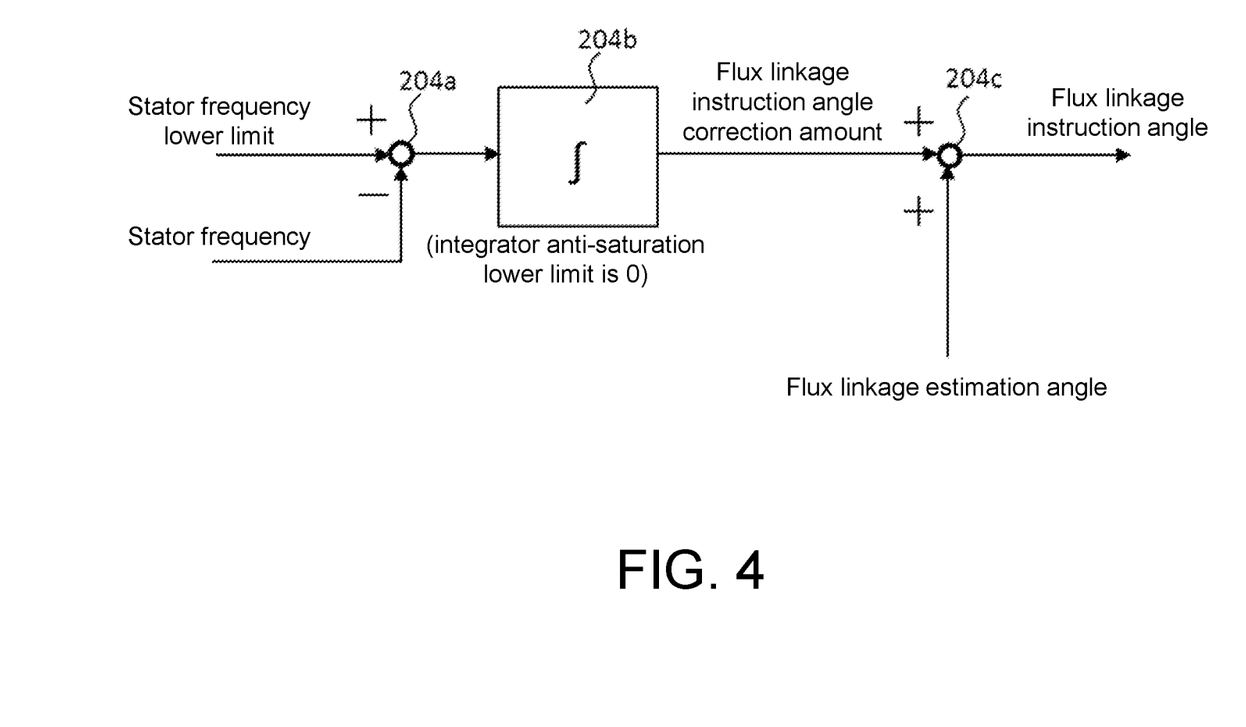
FIG. 4 is a schematic diagram of a flux linkage instruction angle generating unit 204 in the control device of Embodiment 1 of the present application.

FIG. 4 is a schematic diagram of the flux linkage instruction angle generating unit 204 in the control device of Embodiment 1 of the present application. As shown in FIG. 4, the flux linkage instruction angle generating unit 204 includes a frequency difference calculating unit 204a, an integral unit 204b, and a correction unit 204c.

As shown in FIG. 4, the frequency difference calculating unit 204a calculates a difference value between the lower limit $\omega_{1th}$ of the preset stator frequency and the stator frequency $\omega_1$. In an embodiment, the frequency difference calculating unit 204a may be a subtractor, and the calculated difference value is $\omega_{1th}-\omega_1$.

In this embodiment, the integral unit 204b may integrate the difference value to obtain a flux linkage instruction angle correction amount. In an embodiment, a minimum value of the flux linkage instruction angle correction amount is 0. For instance, an anti-saturation lower limit of the integral unit 204b is 0. That is, an integral result of the integral unit 204b is greater than or equal to 0.

In this embodiment, the correction unit 204c corrects the flux linkage estimation angle $\angle\hat{\psi}_r$ by using the flux linkage instruction angle correction amount, to obtain the flux linkage instruction angle. In an embodiment, the correction unit 204c may be an adder, which adds the flux linkage instruction angle correction amount and the flux linkage estimation angle $\angle\hat{\psi}_r$, to obtain the flux linkage instruction angle.

In actual operation of the motor, an actual flux linkage angle and a stator frequency corresponds to each other. The flux linkage instruction angle may be accurately controlled through the flux linkage instruction angle generating unit 204. Accordingly, it is equivalent to ensuring that the stator frequency $\omega_1$ corresponding to the flux linkage angle controlled by the flux linkage instruction angle is always greater than or equal to the lower limit $\omega_{1th}$, such that the control device 30 is prevented from operating in the unstable area.

In this embodiment, as shown in FIG. 3, the control device 30 may further include a flux linkage estimation angle calculating unit 203. Herein, the flux linkage estimation angle calculating unit 203 may perform arctan calculation on flux linkages $\hat{\psi}_{ra}$ and $\hat{\psi}_{rb}$ based on an α-β coordinate system calculated based on a stator voltage signal, a stator current signal, and a speed estimation value of the motor M to obtain the flux linkage estimation angle $\angle\hat{\psi}_r$.

For instance, the flux linkage estimation angle calculating unit 203 may be obtain the flux linkage estimation angle $\angle\hat{\psi}_r$ according to the following formula (2):

$$\angle\hat{\psi}_r = \begin{cases} \dfrac{\pi}{2} & \text{when } \hat{\psi}_{ra}=0 \text{ and } \hat{\psi}_{rb} \geq 0 \\ \dfrac{3\pi}{2} & \text{when } \hat{\psi}_{ra}=0 \text{ and } \hat{\psi}_{rb} < 0 \\ \arctan\left(\dfrac{\hat{\psi}_{rb}}{\hat{\psi}_{ra}}\right) & \text{when } \hat{\psi}_{ra}>0 \text{ and } \hat{\psi}_{rb} \geq 0 \\ \arctan\left(\dfrac{\hat{\psi}_{rb}}{\hat{\psi}_{ra}}\right)+2\pi & \text{when } \hat{\psi}_{ra}>0 \text{ and } \hat{\psi}_{rb} < 0 \\ \arctan\left(\dfrac{\hat{\psi}_{rb}}{\hat{\psi}_{ra}}\right)+\pi & \text{when } \hat{\psi}_{ra}<0 \end{cases} \quad (2)$$

The flux linkage estimation angle $\angle\hat{\psi}_r$ obtained by the flux linkage estimation angle calculating unit 203 may be inputted to the flux linkage instruction angle generating unit 204 for calculation.

According to the present embodiment, when calculating the flux linkage estimation angle $\angle\hat{\psi}_r$, the flux linkage estimation angle calculating unit 203 avoids using the slip frequency $\omega_s$ of the motor for calculation. Therefore, the resistance change of the motor rotor is prevented from affecting the calculation result.

In this embodiment, as shown in FIG. 3, the control device 30 may further include a current/flux linkage estimating unit 109, Clark transforming units 107 and 108, and a speed estimating unit 111.

A voltage detecting unit 105 detects the three-phase stator voltages U, V, and W actually outputted to the motor M to obtain the stator voltage signal. A current detecting unit 106 detects a current flowing through the stator of the motor M to obtain the stator current signal.

The Clark transforming units 107 and 108 perform Clark transformation on the stator voltage signal and the stator current signal to obtain a stator voltage and a stator current of the α-β coordinate system. The current/flux linkage estimating unit 109, based on the speed estimation value fed back by the speed estimating unit 111 and the stator voltage signal and the stator current signal of the α-β coordinate system outputted by the Clark transforming units 107 and 108, generates estimation currents and estimation flux linkages. The estimation flux linkages are represented as $\hat{\psi}_{ra}$ and $\hat{\psi}_{rb}$, where $\hat{\psi}_{ra}$ is an estimation flux linkage of an α axis, and $\hat{\psi}_{rb}$ is an estimation flux linkage of a β axis. In this embodiment, the estimation flux linkages are represented as $\hat{\psi}_{ra}$ and $\hat{\psi}_{rb}$ and are inputted to the flux linkage estimation angle calculating unit 203 used for calculating the flux linkage estimation angle $\angle\hat{\psi}_r$.

In addition, the speed estimating unit 111 may, according to the estimation currents, the estimation flux linkages ($\hat{\psi}_{ra}$ and $\hat{\psi}_{rb}$) and a stator current outputted by the Clark transforming unit 108, calculate a new speed estimation value.

In this embodiment, as shown in FIG. 3, the control device 30 may further include: a stator frequency calculating unit 202. The stator frequency calculating unit 202 may calculate the stator frequency $\omega_1$ not based on the slip frequency $\omega_s$ of the motor. Therefore, the resistance change of the motor rotor is prevented from affecting the calculation result. Accordingly, the control device can be run outside the unstable area, and stability of control by the control device is improved.

As shown in FIG. 3, in an embodiment, the stator frequency calculating unit 202 may derive the flux linkage estimation angle $\angle\hat{\psi}_r$ with respect to time to obtain the stator frequency $\omega_1$. For instance, the stator frequency calculating unit 202 may calculate the stator frequency $\omega_1$ according to the following formula (3):

$$\omega_1 = \frac{d}{dt}\angle\hat{\psi}_r \quad (3)$$

In addition, in this embodiment, the stator frequency calculating unit 202 may also adopt other manners to calculate the stator frequency $\omega_1$.

Figure 5:
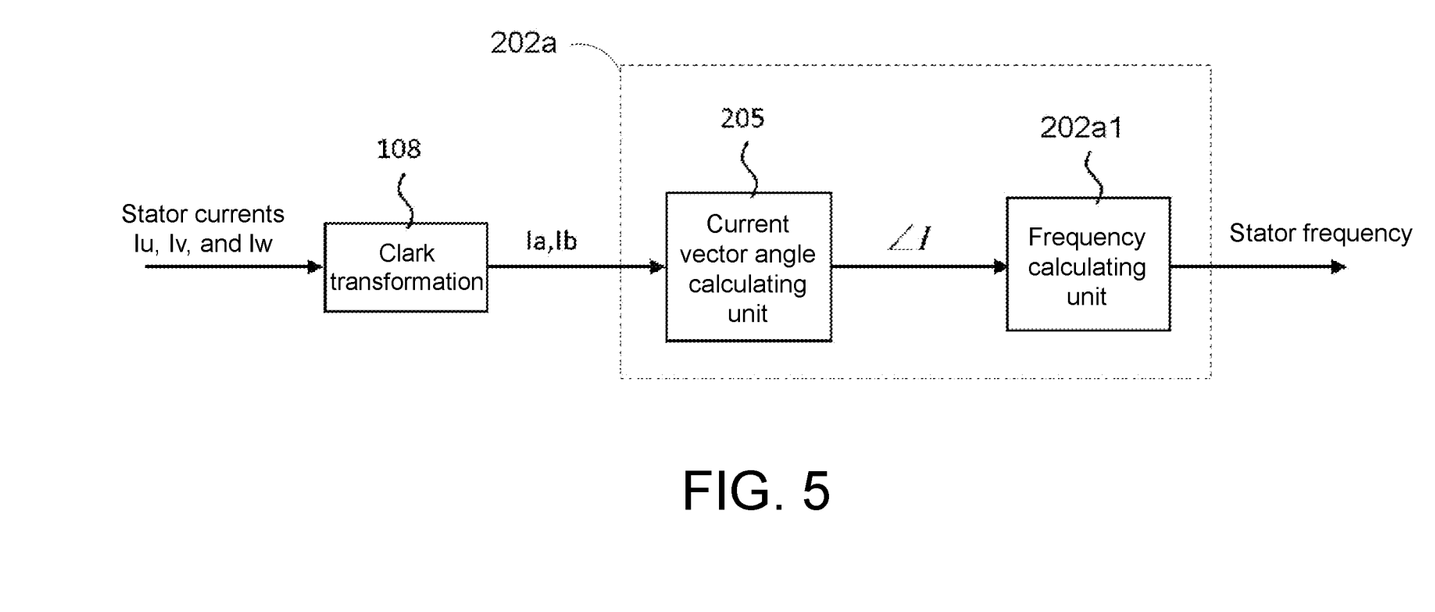

For instance, in another embodiment, a stator frequency calculating unit 202a may perform arctan calculation on currents $I_a$ and $I_b$ based on the α-β coordinate system obtained based on a stator current flowing into the motor M to obtain a current vector angle $\angle I$ and performs a differential operation on the current vector angle $\angle I$ next to obtain the stator frequency $\omega_1$.

FIG. 5 is a schematic diagram of the stator frequency calculating unit 202a. As shown in FIG. 5, stator currents $I_U$, $I_V$, and $I_W$ detected by the current detecting unit 106 are transformed into the currents $I_a$ and $I_b$ based on the α-β coordinate system by the Clark transforming unit 108, where $I_a$ is a current of the α axis, and $I_b$ is a current of the β axis.

In this embodiment, the currents $I_a$ and $I_b$ are inputted to the stator frequency calculating unit 202a. The stator frequency calculating unit 202a includes: a current vector angle calculating unit 205 and a frequency calculating unit 202a1.

As shown in FIG. 5, the current vector angle calculating unit 205 obtains the current vector angle $\angle I$ according to the currents $I_a$ and $I_b$ where the current vector angle calculating unit 205 may calculate the current vector angle $\angle I$ through, for example, the following formula (4):

$$\angle I = \begin{cases} \dfrac{\pi}{2} & \text{when } I_a = 0 \text{ and } I_b \geq 0 \\ \dfrac{3\pi}{2} & \text{when } I_a = 0 \text{ and } I_b < 0 \\ \arctan\left(\dfrac{I_b}{I_a}\right) & \text{when } I_a > 0 \text{ and } I_b \geq 0 \\ \arctan\left(\dfrac{I_b}{I_a}\right) + 2\pi & \text{when } I_a > 0 \text{ and } I_b < 0 \\ \arctan\left(\dfrac{I_b}{I_a}\right) + \pi & \text{when } I_a < 0 \end{cases} \quad (4)$$

In this embodiment, the frequency calculating unit 202a1 may derive the current vector angle $\angle I$ calculated by the current vector angle calculating unit 205, so as to calculate the stator frequency $\omega_1$. For instance, the frequency calculating unit 202a1 may calculate the stator frequency $\omega_1$ according to the following formula (5):

$$\omega_1 = \dfrac{d}{dt} \angle I \quad (5)$$

In this embodiment, as shown in FIG. 3, the control device 30 may further include a speed instruction correction amount calculating unit 201. The speed instruction correction amount calculating unit 201 may calculate a speed instruction correction amount according to the lower limit $\omega_{1th}$ of the preset stator frequency and the stator frequency $\omega_1$. Herein, the speed instruction correction amount is used for adjusting a speed instruction value inputted to the control device 30, so as to calculate the torque voltage instruction.

Figure 6:
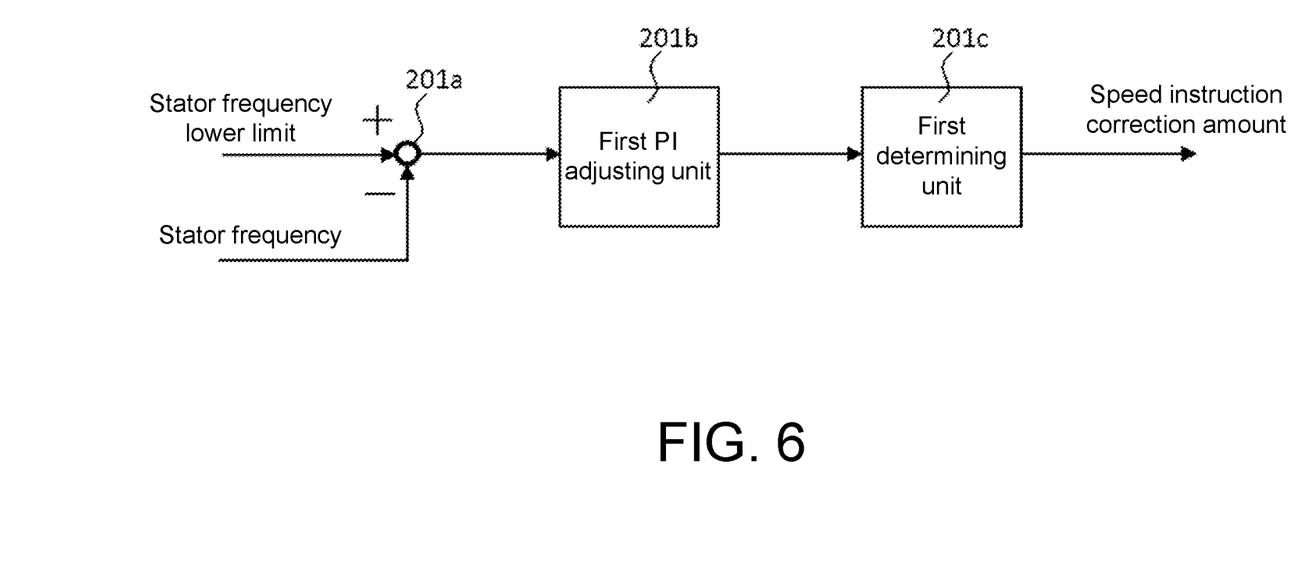
FIG. 6 is a schematic diagram of a speed instruction correction amount calculating unit 201 of Embodiment 1 of the present application.

FIG. 6 is a schematic diagram of the speed instruction correction amount calculating unit 201 of an embodiment of the present application. As shown in FIG. 6, the speed instruction correction amount calculating unit 201 includes: a first calculating unit 201a and a first determining unit 201c.

Herein, the first calculating unit 201a is used for calculating the difference value between the lower limit $\omega_{1th}$ of the preset stator frequency and the stator frequency $\omega_1$. The first determining unit 201c determines the speed instruction correction amount according to the difference value calculated by the first calculating unit 201a.

As shown in FIG. 6, the first calculating unit 201a may be a subtractor, and the calculated difference value is, for example, $\omega_{1th} - \omega_1$. When the difference value is less than 0, it means that $\omega_1$ is located outside the unstable area, and at this time, the first determining unit 201c determines that the outputted speed instruction correction amount is 0. When the difference value is greater than or equal to 0, it means that $\omega_1$ is located inside the unstable area, and at this time, the first determining unit 201c determines to output the difference value to act as the speed instruction correction amount.

In addition, in this embodiment, as shown in FIG. 6, the speed instruction correction amount calculating unit 201 may further include: a first proportional integral (PI) adjusting unit 201b. The first PI adjusting unit 201b may perform a proportional integral operation according to the difference value calculated by the first calculating unit 201a and outputs a PI operation result.

Herein, the first determining unit 201c may output the speed instruction correction amount according to the PI operation result. For instance, when the PI operation result is less than 0, the first determining unit 201c determines that the outputted speed instruction correction amount is 0. When the PI operation result is greater than or equal to 0, the first determining unit 201c determines that the outputted speed instruction correction amount is the PI operation result.

In FIG. 6, through arrangement of the first PI adjusting unit 201b, stability of the outputted speed instruction correction amount may be improved.

According to the present embodiment, the speed instruction correction amount calculating unit 201 of the present application may calculate the speed instruction correction amount without depending on the slip frequency $\omega_s$ of the motor. Therefore, the resistance change of the motor rotor is prevented from affecting the calculation result.

In this embodiment, as shown in FIG. 3, the control device 30 may further include a torque current instruction calculating unit 116. The torque current instruction calculating unit 116 may, based on the inputted speed instruction value, the speed estimation value outputted by the speed estimating unit 111, and the speed instruction correction amount outputted by the speed instruction correction amount calculating unit 201, calculate the torque current instruction.

Figure 7:
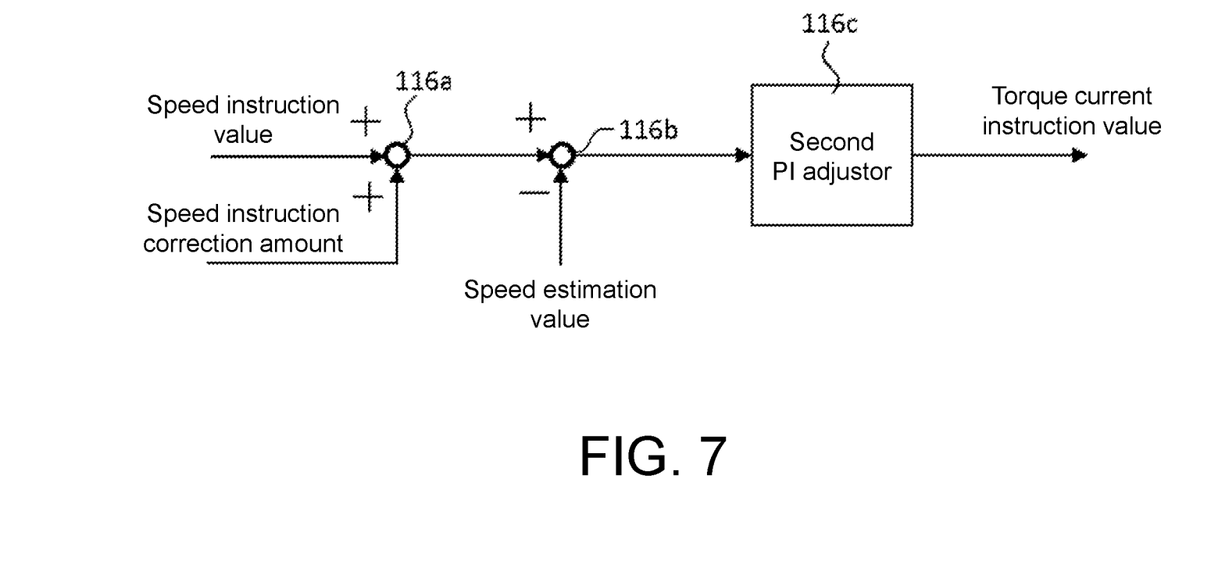
FIG. 7 is a schematic diagram of a torque current instruction calculating unit 116.

FIG. 7 is a schematic diagram of the torque current instruction calculating unit 116. As shown in FIG. 7, the torque current instruction calculating unit 116 includes an adder 116a, a subtractor 116b, and a second PI adjustor 116c. Accordingly, in the torque current instruction calculating unit 116, the speed instruction value is added to the speed instruction correction amount, the speed estimation value is subtracted from a result of such addiction to obtain a difference value, and the difference value is subjected to a PI operation by the second PI adjustor 116c. A result of the PI operation by the second PI adjustor 116c is treated as the torque current instruction value to be outputted to the torque current adjusting unit 102.

In this embodiment, description of other units in FIG. 3 may be found with reference to Patent Literature 1.

In this embodiment, based on the related art, the torque current instruction calculating unit 116 is modified, and the speed instruction correction amount calculating unit 201, the stator frequency calculating unit 202, the flux linkage estimation angle calculating unit 203, and the flux linkage instruction angle generating unit 204 are added. Accordingly, the stator frequency $\omega_1$ may be controlled within a stable area (alternatively, outside the unstable area) without depending on the slip frequency $\omega_s$ of the motor, that is, it is ensured that $\omega_1 \geq \omega_{1th}$, and as such, stability of control by the control device is improved.

Effects of the control device of the present application are further described by an embodiment as follows. In the embodiment, rated voltage of the induction motor is 200V, rated power is 2.2 kW, the motor performs clockwise rotation, a load torque is −27.6 Nm, and a stable area boundary (i.e., the lower limit of the preset stator frequency) is $\omega_{1th} = 0.5$ Hz.

Figure 8:
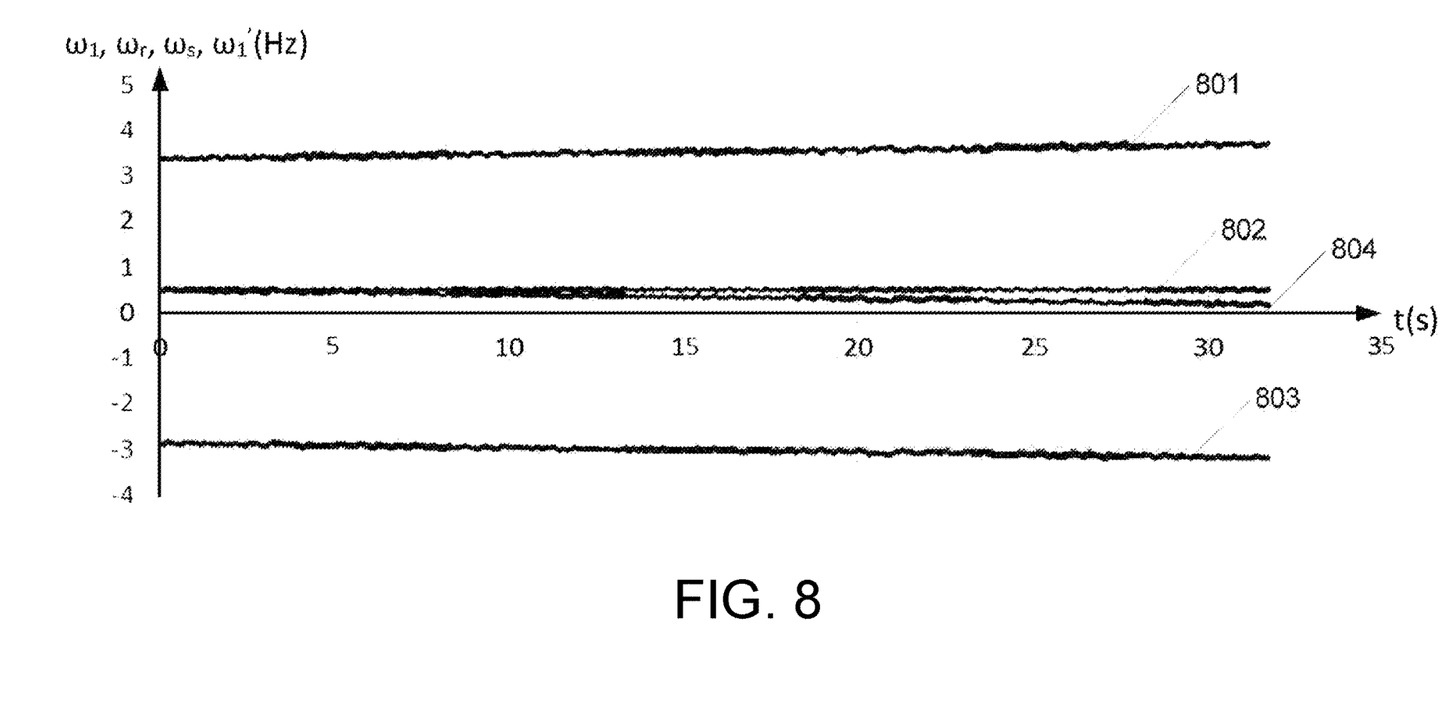
FIG. 8 is a schematic diagram of vector control performed on the motor in the embodiment.

FIG. 8 is a schematic diagram of vector control performed on the motor in the embodiment. In FIG. 8, a horizontal axis is time, a unit is second (S), a vertical axis is frequency, and a unit is hertz (Hz). Herein, a curve 801 is an actual rotation speed $\omega_r$ of a rotor of the motor M when the control device performs controlling according to this embodiment, a curve 802 is the stator frequency $\omega_1$ of the motor M when the control device performs controlling according to this embodiment, a curve 803 is the slip frequency $\omega_s$ of the motor M, and a curve 804 is a stator frequency $\omega_1'$ of the motor M when the control device performs controlling according to Patent Literature 1.

As shown in FIG. 8, when a load is stable, as rotor resistance Rr increases in temperature because of long-term operation, an absolute value of the actual slip frequency $\omega_s$ increases accordingly (as shown by the curve 803). When the control device according to the present embodiment performs controlling, the speed instruction correction amount is automatically adjusted through PI, so that the actual speed $\omega_r$ automatically increases, and $\omega_1$ is ensured to be stable at $\omega_{1th}$. That is, the curve 802 does not drop, and overall stability of a control system is accordingly accomplished.

In contrast, when the control device using Patent Literature 1 performs controlling, in the case that Rr increases because of a temperature rise, since the slip frequency is still calculated based on a nominal value of Rr, the calculated slip frequency is smaller than the actual slip frequency. As such, the actually obtained $\omega_1'$ may be lower than the stable area boundary $\omega_{1th}$ (as shown by the curve 804), such that the motor may not be stably controlled.

Embodiment 2

Embodiment 2 of the present application provides a control method for an induction motor, and such control method corresponds to the control device 30 of Embodiment 1.

Figure 9:
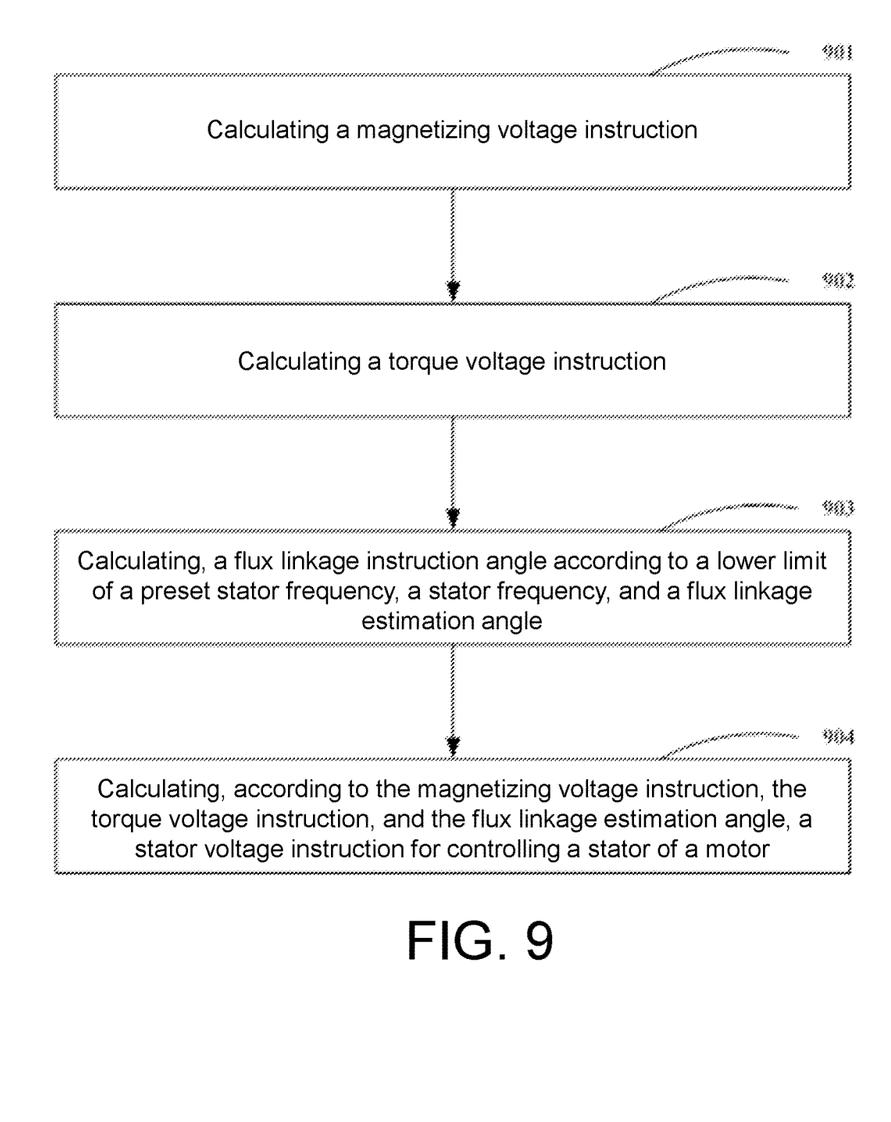
FIG. 9 is a schematic chart of a control method for an induction motor of Embodiment 2 of the present application.

FIG. 9 is a schematic chart of a control method for an induction motor of this embodiment, and as shown in FIG. 9, the method includes:

step 901: calculating a magnetizing voltage instruction;
step 902: calculating a torque voltage instruction;
step 903: calculating a flux linkage instruction angle according to a lower limit of a preset stator frequency, a stator frequency, and a flux linkage estimation angle; and
step 904: calculating, according to the magnetizing voltage instruction, the torque voltage instruction, and the flux linkage instruction angle, a stator voltage instruction for controlling stator operation of the motor.

Description related to each step of the control method may be found with reference to the description of corresponding units of Embodiment 1. Besides, the control method may further include steps other than the steps described in FIG. 9, and description thereof may be found with reference to description of each unit in the control device 30 of Embodiment 1.

According to this embodiment, the stator frequency $\omega_1$ may be controlled within the stable area (alternatively, outside the unstable area) without depending on the slip frequency $\omega_s$ of the motor, that is, it is ensured that $\omega_1 \geq \omega_{1th}$, and as such, stability of control by the control device is improved.

A parameter calculation device described in combination with the embodiments of the present application may be directly implemented as hardware, a software module executed by a processor, or a combination of the two. The hardware module may be implemented by curing the software module by using a field programmable gate array (FPGA), for example.

The software module may be located in RAM memory, flash memory, ROM memory, EPROM memory, EEPROM memory, register, hard disk, removable disk, CD-ROM, or any other form of a storage medium known in the art. A storage medium may be coupled to the processor, so that the processor may read information from the storage medium and write information to the storage medium; alternatively, the storage medium may be a component of the processor. The processor and storage medium may be located in the ASIC. The software module may be stored in the memory of the mobile terminal, and may also be stored in a memory card that can be inserted into the mobile terminal. For instance, if an electronic apparatus uses a larger-capacity MEGA-SIM card or a large-capacity flash memory device, the software module may be stored in the MEGA-SIM card or a large-capacity flash memory device.

The parameter calculation device described in this embodiment may be implemented as a general-purpose processor, a digital signal processor (DSP), an application specific integrated circuit (ASIC), and a field programmable gate array (FPGA) or other programmable logic device, discrete gate or transistor logic device, discrete hardware component, or any appropriate combination thereof for performing the functions described in the present application. It may also be implemented as a combination of calculation apparatuses, for example, a combination of a DSP and a microprocessor, multiple microprocessors, one or a plurality of microprocessors in communication with the DSP, or any other such configuration.

The present application is described above in conjunction with specific embodiments, but it should be clear to a person of ordinary skill in the art that these descriptions are all exemplary and do not limit the protection scope of the present application. A person of ordinary skill in the art may make various variations and modifications to the present application according to the spirit and principle of the present application, and these variations and modifications are also within the scope of the present application.

What is claimed is:

1. A control device for an induction motor, comprising:
a magnetizing current adjusting unit, used for calculating a magnetizing voltage instruction;
a torque current adjusting unit, used for calculating a torque voltage instruction;
a flux linkage instruction angle generating unit, calculating a flux linkage instruction angle according to a lower limit a $\omega_{1th}$ of a preset stator frequency, a stator frequency $\omega_1$, and a flux linkage estimation angle $\angle \hat{\psi}_r$; and
a motor stator voltage instruction calculating unit, calculating, according to the magnetizing voltage instruction, the torque voltage instruction, and the flux linkage instruction angle, a stator voltage instruction for controlling a stator of the motor.

2. The control device for an induction motor according to claim 1, wherein the flux linkage instruction angle generating unit comprises:
a frequency difference calculating unit, calculating a difference value between the lower limit $\omega_{1th}$ of the preset stator frequency and the stator frequency $\omega_1$;
an integral unit, integrating the difference value to obtain a flux linkage instruction angle correction amount; and
a correction unit, correcting the flux linkage estimation angle $\angle \hat{\psi}_r$ by using the flux linkage instruction angle correction amount to obtain the flux linkage instruction angle.

3. The control device for an induction motor according to claim 2, wherein a minimum value of the flux linkage instruction angle correction amount is 0.

4. The control device for an induction motor according to claim 1, wherein the control device further comprises:
a flux linkage estimation angle calculating unit, performing arctan calculation on flux linkages $\hat{\psi}_{ra}$ and $\hat{\psi}_{rb}$ based on an α-β coordinate system calculated based on a stator voltage signal, a stator current signal, and a speed estimation value of the motor to obtain the flux linkage estimation angle $\angle \hat{\psi}_r$.

5. The control device for an induction motor according to claim 1, wherein the control device further comprises:
a stator frequency calculating unit, deriving the flux linkage estimation angle $\angle \hat{\psi}_r$ with respect to time to obtain the stator frequency $\omega_1$.

6. The control device for an induction motor according to claim 1, wherein the control device further comprises:
a stator frequency calculating unit, performing arctan calculation on currents $I_a$ and $I_b$ based on an α-β coordinate system obtained based on a stator current flowing into the motor to obtain a current vector angle $\angle I$ and performing a differential operation on the current vector angle $\angle I$ next to obtain the stator frequency $\omega_1$.

7. The control device for an induction motor according to claim 1, wherein the control device further comprises:
a speed instruction correction amount calculating unit, used for calculating a speed instruction correction amount according to the lower limit $\omega_{1th}$ of the preset stator frequency and the stator frequency $\omega_1$,
wherein the speed instruction correction amount is used for adjusting a speed instruction value, so as to calculate the torque voltage instruction.

8. The control device for an induction motor according to claim 7, wherein the speed instruction correction amount calculating unit comprises:
a first calculating unit, used for calculating a difference value between the lower limit $\omega_{1th}$ of the preset stator frequency and the stator frequency $\omega_1$; and
a first determining unit, determining the speed instruction correction amount according to the difference value calculated by the first calculating unit.

9. The control device for an induction motor according to claim 8, wherein the speed instruction correction amount calculating unit further comprises:
a first proportional integral (PI) adjusting unit, performing a proportional integral operation according to the difference value calculated by the first calculating unit and outputting a proportional integral operation result,
wherein the first determining unit determines that the speed instruction correction amount is 0 when the proportional integral operation result is less than 0,
wherein the first determining unit determines that the speed instruction correction amount is the proportional integral operation result when the proportional integral operation result is greater than or equal to 0.

10. A control method for an induction motor, comprising:
calculating a magnetizing voltage instruction;
calculating a torque voltage instruction;
calculating a flux linkage instruction angle according to a lower limit of a preset stator frequency, a stator frequency, and a flux linkage estimation angle; and
calculating, according to the magnetizing voltage instruction, the torque voltage instruction, and the flux linkage instruction angle, a stator voltage instruction for controlling stator operation of the motor.

* * * * *